US009510290B2

(12) United States Patent
Gutierrez, Jr.

(10) Patent No.: US 9,510,290 B2
(45) Date of Patent: Nov. 29, 2016

(54) MOBILE BATTERY CONSUMPTION ANALYSIS SYSTEM AND METHOD OF OPERATING ON DELTA CHARGE SAMPLES

(75) Inventor: Alberto Gutierrez, Jr., Palo Alto, CA (US)

(73) Assignee: AT&T MOBILITY IP, LLC, Atlanta, GA (US)

( * ) Notice: Subject to any disclaimer, the term of this patent is extended or adjusted under 35 U.S.C. 154(b) by 469 days.

(21) Appl. No.: 13/572,473

(22) Filed: Aug. 10, 2012

(65) Prior Publication Data

US 2014/0045436 A1  Feb. 13, 2014

(51) Int. Cl.
*H04B 1/38* (2015.01)
*H04W 52/02* (2009.01)
*H04M 1/725* (2006.01)

(52) U.S. Cl.
CPC ..... *H04W 52/0264* (2013.01); *H04M 1/72522* (2013.01); *H04W 52/0261* (2013.01)

(58) Field of Classification Search
CPC .......... G01R 31/3651; G01R 31/3679; G01R 19/16542; G01R 31/3606; G01R 31/3682; H04W 52/0264; H04W 52/0261; H01M 1/72522
USPC ........ 455/67.11, 575.2–575.4; 320/118, 125, 320/127
See application file for complete search history.

(56) References Cited

U.S. PATENT DOCUMENTS

| | | | |
|---|---|---|---|
| 2009/0132186 A1* | 5/2009 | Esnard et al. | 702/63 |
| 2011/0040990 A1* | 2/2011 | Chan | G06F 1/28 713/300 |
| 2011/0111799 A1* | 5/2011 | Kothari et al. | 455/556.2 |
| 2011/0207509 A1* | 8/2011 | Crawford | 455/574 |
| 2012/0322387 A1* | 12/2012 | Nicoara | H04M 1/24 455/67.11 |
| 2013/0196720 A1* | 8/2013 | Sivaraman et al. | 455/573 |

\* cited by examiner

*Primary Examiner* — Nay A Maung
*Assistant Examiner* — Angelica M Perez
(74) *Attorney, Agent, or Firm* — Workman Nydegger

(57) ABSTRACT

A method for operation of a battery consumption analysis server communicatively coupled to a plurality of mobile devices over radio channels to receive packages of data recorded at each mobile device containing application use, and battery charging and discharging events. By receiving independent sets of information from the mobile device wherein independent sets comprise at least one of wireless phone activities and battery use, combining this information in such a way that the battery consumption or over consumption of specific applications are identified, the apparatus and method configures a display to identify the correspondingly bad applications to a user.

17 Claims, 7 Drawing Sheets

In-Focus Battery-App Timeline

CCS1, BLS1=50%,,Tcc1S

CCE1, BLE1=100% Tcc1E

A3, Tb2, BL=99%

A2, Tb3, 98%

A3, Tb5, 93%

CCS2, BLS2=96%, Tcc2S

CCS2, BLE2=100%, Tcc2E

A2, Tb6, 100%,

A1, Tb9, 97%

A2, Tb10, 95%

CCS3, BLS3=95%, Tcc3S

CCE3, BLE3=100%, Tcc3E

A3, Tb11, 99%

A1, Tb12, 97%

CCS4, BLS4=97%, TccS4

CCS4, BLE4=100%, TccE4

Fig. 3

Relative Discharge Battery-App Timeline

CCS1, BLS1=50%,,Tcc1S

CCE1, BLE1=100% Tcc1E

A1 ,B1=30%, A2, B2=50%, A3, B3=20%, 95%, Tb2

A1, B1, A2, B2, A3, B3, A4, B4, 90%, Tb3

A2, B32, A3, B3, 85% Tb4

CCS2, BLS2=83%, Tcc2S

CCS2, BLE2=100%, Tcc2E

A2, B2, A3, B3, A5, B5, 100%, Tb5

A1, B1, A3, B3, A4, B4, 95% Tb6

A1, B1, A2, B2, A3, B3, 90%  Tb7

CCS2, BLS2=89%, Tcc2S

CCE3, BLE3=100%, Tcc3E

A3, B3, A4, B4, 100%, Ta7

A1, B1, A2, B2, A5, B5, 95%Tb8

CCS4, BLS4=92%, TccS4

CCS4, BLE4=100%, TccE4

Fig. 6

MOBILE BATTERY CONSUMPTION ANALYSIS SYSTEM AND METHOD OF OPERATING ON DELTA CHARGE SAMPLES

RELATED APPLICATIONS

None

BACKGROUND

Conventional measurements do not provide a readily available answer to which applications or device components are responsible for the battery drain over a period of time and which are causing inordinate drain on the battery. The main problem being solved is to quantify activities or conditions that result in consuming the mobile phone battery. This in turn will enable determination of whether or not the consumption is within reason for the usage pattern or if certain activities or conditions such as specific applications, voice calls, poor coverage, bad battery, or combinations thereof, are responsible for poor battery charge lifetime. It is important to note that the original motivation for this invention was to answer the question of which applications are overly consuming the device battery. In order to answer this question, however, it is necessary to solve the bigger problem of quantifying total consumption of the battery usage. From solving this bigger problem the answer to identifying which applications are bad (i.e., overly consuming the battery) is also answered.

What is needed is an answer to the question—which applications or components are responsible for draining the battery so fast, or in other words those that are responsible for inordinate battery drain. What is needed is a method to transform disparately collected information streams from the device and transforms them into an application battery timeline, which greatly simplifies and enables algorithms for identifying applications/components which inordinately drain the battery.

SUMMARY OF THE INVENTION

A method for operating a system is disclosed to control a processor and memory to identify root causes in battery consumption within mobile devices. A plurality of package types provide data content recorded at and transmitted from one or more mobile devices. These independent packages are received and processed to generate battery use timelines. Estimates are projected based on virtual or actual sampling at equal increments of battery discharge rather than conventional equal increments of elapsed time. From the resulting timelines, analysis methods determine which applications or groups of applications correlate with high battery drain.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which

FIGS. 3 and 6 are exemplary illustrations of resulting timelines determined by applying the method steps of FIGS. 2 and 5 to transform the device information streams illustrated in FIGS. 1, and 4.

DETAILED DISCLOSURE OF EMBODIMENTS

In the below disclosure we begin with various types of packages of collected metrics which can be acquired at low cost and disruption. It is a requirement that the user experience mimimal interference or contention for resources whenever he wishes to use the device for its intended purpose. It is also a requirement that measuring battery consumption should not be a significant factor in battery discharge itself.

Therefore, information may be collected at the beginning, during, and completion of a battery recharging cycle without significantly impacting battery capacity. That is, any current consumed to collect data while the battery is connected to an ac supply is easily and quickly made up from ac. A battery discharge cycle begins when connection to AC supply is terminated and ends when AC supply is reconnected. A battery-use timeline may contain one or more discharge cycles. An additional timestamp is recorded at each increment of discharge as measured by coulomb counting in percentages of capacity. Ten to 100 timestamps may be recorded in embodiments. Therefore timestamps from State of Charge=100 to zero is possible although few discharge cycles take a battery charge all the way to zero. Each quantum of discharge occurs between two timestamps during which a fixed percentage of total available coulombs are discharged.

Applications may have several states of operation. They may be off, on-in-focus, and on-out-of-focus. We receive packages which records when applications are started-in-focus, started-out-of-focus, or ended, when an application transits from out-of-focus to in-focus, and when an application transits from in-focus to out-of-focus. It is understood that when an application starts-in-focus or transitions to in-focus, all of the previously started application assume the out-of-focus state until they either end or transition to in-focus later.

Another group of packages of metrics may be collected in an embodiment on the basis of cellular radio operations. This includes transmit and receive power, start and end of voice or data calls and searching for connectivity.

For any battery discharge cycle, the application packages and cellular packages are selected which occur between the start and end of the discharge cycle. In an embodiment, packages which cover the period while the device is on AC supply are ignored.

Figure 1:
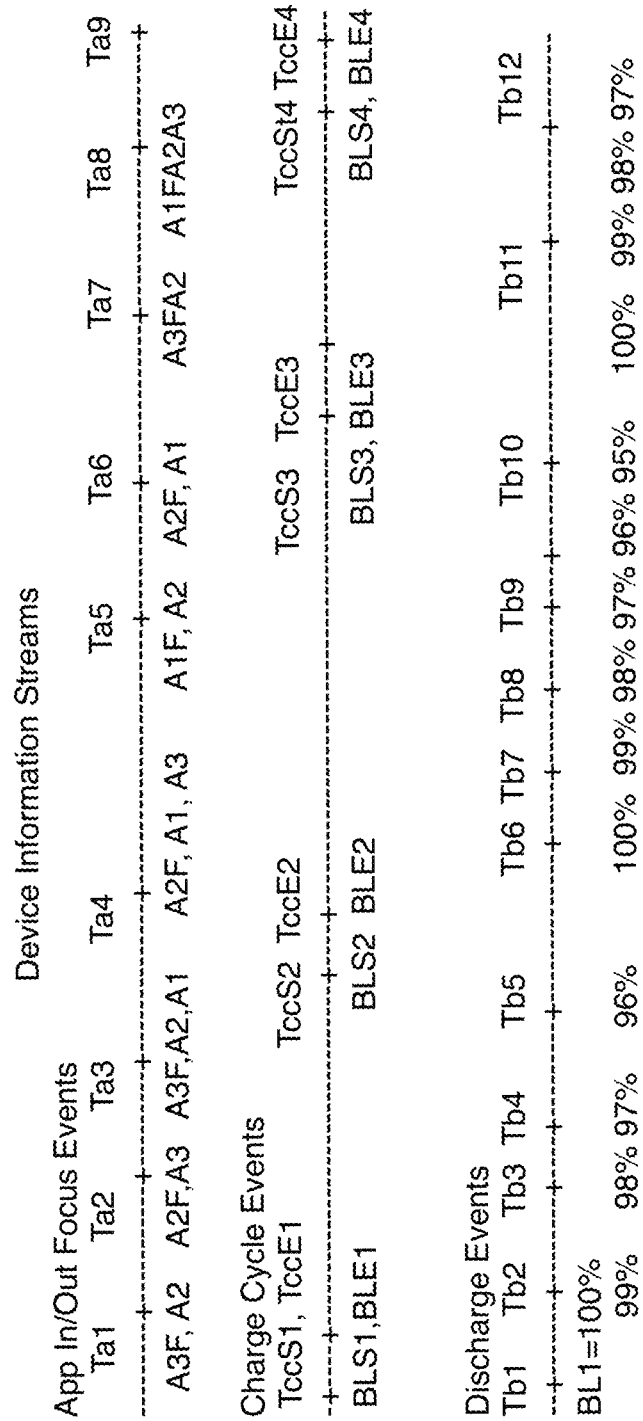
FIGS. 1 and 4 are illustrations of exemplary device information streams recorded at a mobile device.

FIG. 1 depicts an information stream from 1 mobile device. There may be such an information stream coming from a multitude of mobile devices. Because they are mobile, the information streams, i.e. diagnostics information, are configured to consume an insignificant percentage of the battery as compared to applications on the device and the operations of the mobile phone. A first type of package records in-focus and out-of-focus application events. Typically, in-focus corresponds to being in the foreground of an electronic display and also responding to the user interactively and taking priority control of the processor to the degree that any applications can contend against another application. Timestamps record the changes in focus, and which application are in or out of focus after the focus transition events. At Ta5 timestamp, only two of the previously noted applications still remain active and the focus has changed from A2 to A1. This is a visualization and does not reflect the actual encoding of the packages which would be much more terse. A second stream of device information is the series of charge cycle events shown in the middle rank of FIG. 1. This provides start time and battery level and stop time and battery level for each charging cycle. The useful discharge measurements occur after the end of a previous charge cycle and before the beginning of the following charge cycle. The third stream of events has to do with discharge. In an embodiment, a separate process only tracks increments of discharge. Within this application we define a Qulomb as a unit of discharge. An exemplary unit of discharge would be one percent of the fully charged capacity of a battery measured in milliamp hours or charge. Discharge events record timestamps at every Qulomb milestone of discharge after the end of a charge cycle. Other device information streams that may be useful, but not necessary, are for example, device location, roaming status (i.e., home network, roaming network, no service). Additionally, for example, even if device location is not recorded by the device in the device information streams, the cell tower/base station which is receiving the packages is known by the system and to the carrier and that information can be appended to the packages and used for analysis across a plurality of mobile devices.

Figure 2:
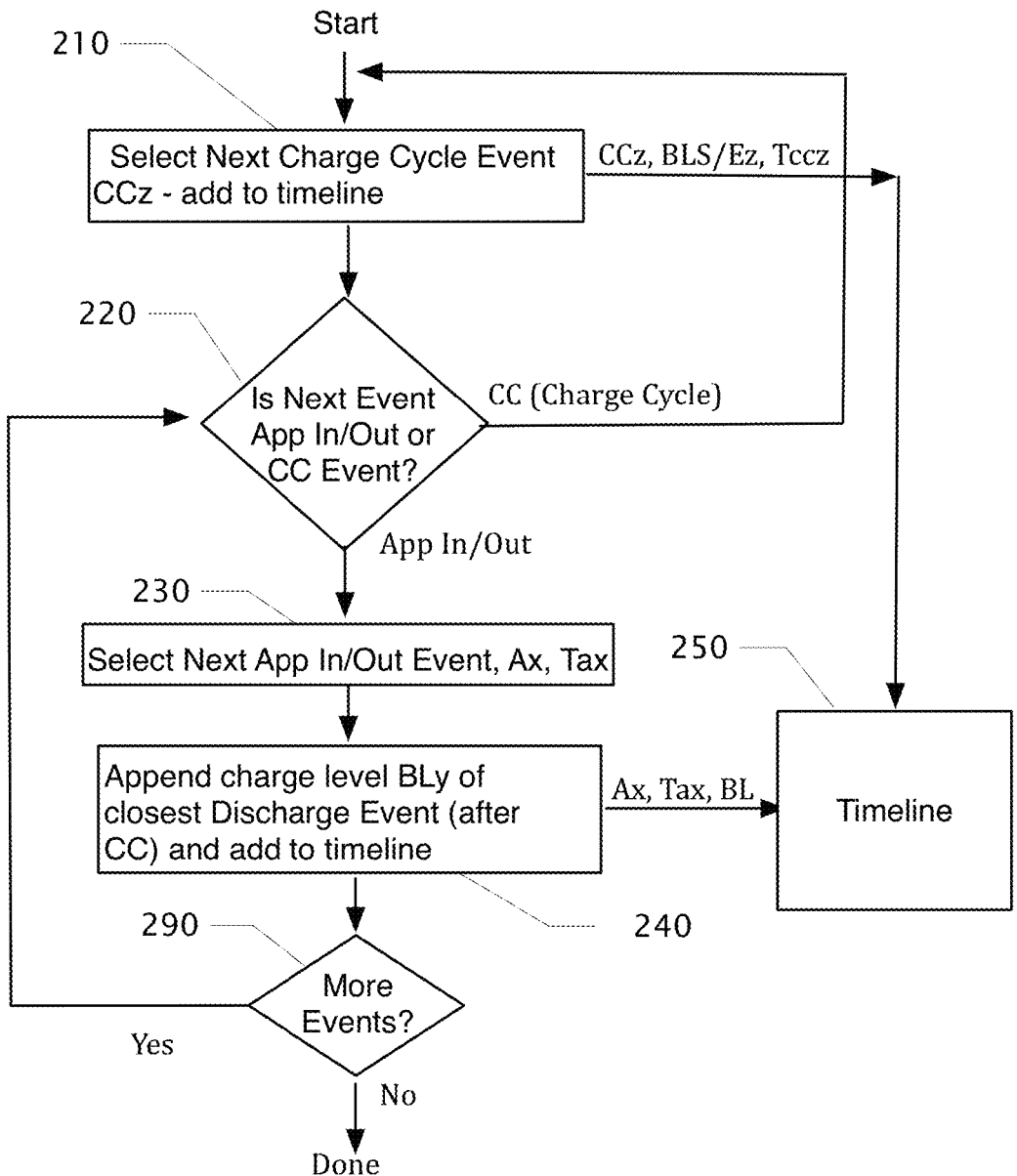
FIGS. 2 and 5 are flowcharts of a method for controlling a processor and memory.

Referring now to FIG. 2, in an embodiment we start with charge cycle events 210. In an embodiment known to those skilled in the art, we could start with the first charge cycle. In an embodiment known to those skilled in the art we could start with the first app event. In an embodiment known to those in the art we could start with any discharge event where the battery level is 100%. In an embodiment the method selects the next charge cycle event and adds it to a timeline 210 which includes the battery level at that instant. On the condition that the next event is a charge cycle event 220, the previous step is repeated. On the condition that the next event is not a charge cycle event 220, the next application in/out of focus event is selected 230. In an embodiment, an estimate of the battery level is made by using that of the closest discharge event. In an embodiment, the previous discharge event is used for the estimate. In an embodiment, a linear interpolation is used for the estimate. The estimate of battery level and the in-focus application is added to the timeline at the timestamp of the battery discharge event timestamp (i.e., effectively a sampling of the In-focus application at the time of the discharge event) 250. On the condition that there are more events in any of the packages 290, the process resumes by determining if the next event is a charge cycle event or a charge cycle event.

As a result of a first method, an exemplary in-focus timeline is displayed in FIG. 3. It is particularly pointed out that out of focus applications are not represented in this estimate of battery consumption. Note that time is not continuous or uniform in the timeline but data is sampled at uniform increments of discharge.

Figure 4:
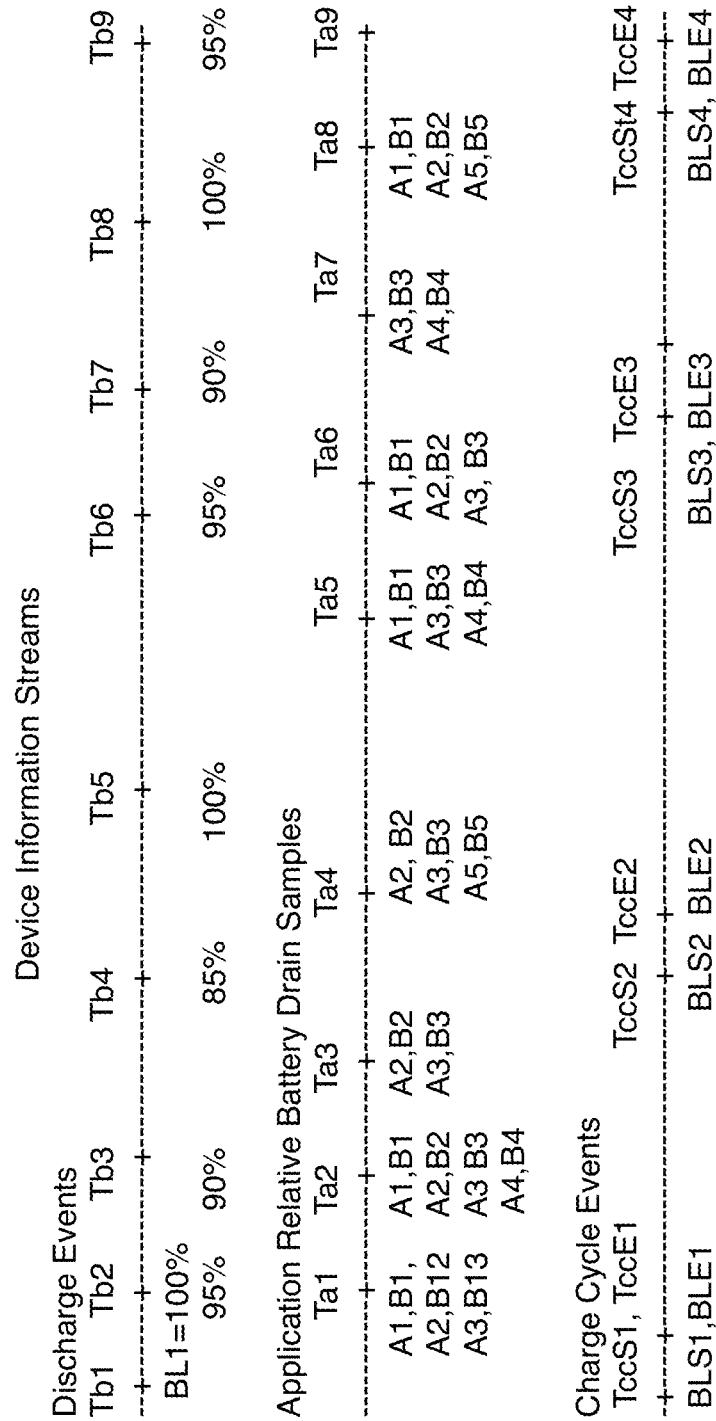

Referring now to FIG. 4 which provides a different array of device information streams. The first rank shown has a different threshold for recording discharge events. Here Qulombs of discharge correspond to five percentage points of the fully charged battery. Again timestamps are recorded at each Qulomb milestone.

The third stream of charge cycle events again records the time start and battery level and time end and battery level of each charging cycle.

The middle stream of application relative battery drain samples records all of the applications active at a timestamp and additionally provides the relative percentage of total battery drain at that instant attributable to each of the active applications. In an embodiment the trigger for the sampling of applications and their relative battery consumption rates is the same as triggering the discharge event timestamps. It is particularly pointed out that this method of estimation omits applications which start after a first trigger and end before the subsequent trigger. But those application will be fairly represented according to their probability of occurrence in a sufficiently large set of samples. Furthermore, the choice of discharge event sampling delta (e.g., 1% 5%, etc) is chosen so as catch the significant occurrences of application use battery discharge.

Figure 5:
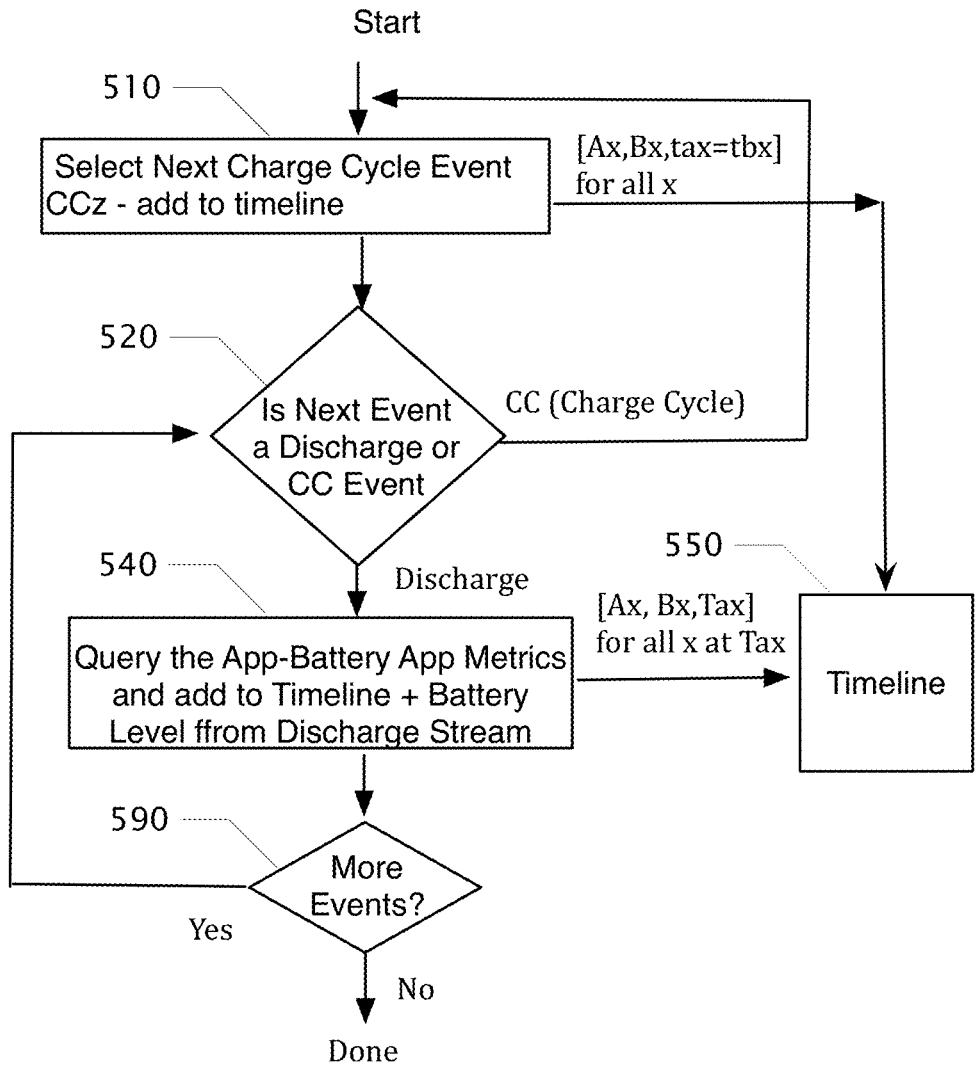

Referring now to FIG. 5, in an embodiment, a method comprises on the condition that the next event is a charge cycle event 520, selecting the next charge cycle event and adding it to the time line 550. On the condition that the next event is a discharge event 520, query the App-Battery App Metrics and add to the timeline with the battery level from the coincident timestamp, with the timestamp (Tby) of the discharge event of the discharge event stream. This is effectively a sampling of the application samples at the time of the discharge event. In an embodiment, the Qulomb of discharge following the timestamp is allocated to each application according to its percent of total discharge. In an embodiment, the Qulomb of discharge prior to the timestamp is allocated to each application according to its percentage of total discharge. On the condition that there are remaining events in any stream 590, the method continues to determine whether the next event is a discharge or a charge cycle event 520.

Referring now to FIG. 6, a resulting battery timeline provides a plurality of charging cycle delimiters within which a plurality of samples are taken at timestamps which correspond to Qulomb milestones of discharge. In effect, sampling occurs at equal units of total battery discharge rather than equal units of elapsed time. Subtracting the battery levels between adjacent timestamps and dividing by the difference between two adjacent timestamps provides a discharge rate of Qulomb per unit time. Either the applications of the first sample or the applications of the second sample may be used to estimate the consumption of battery by each application by multiplying the percent of total discharge by the Qulombs per unit time of that period (the period of time between the first sample and the second sample).

Figure 7:
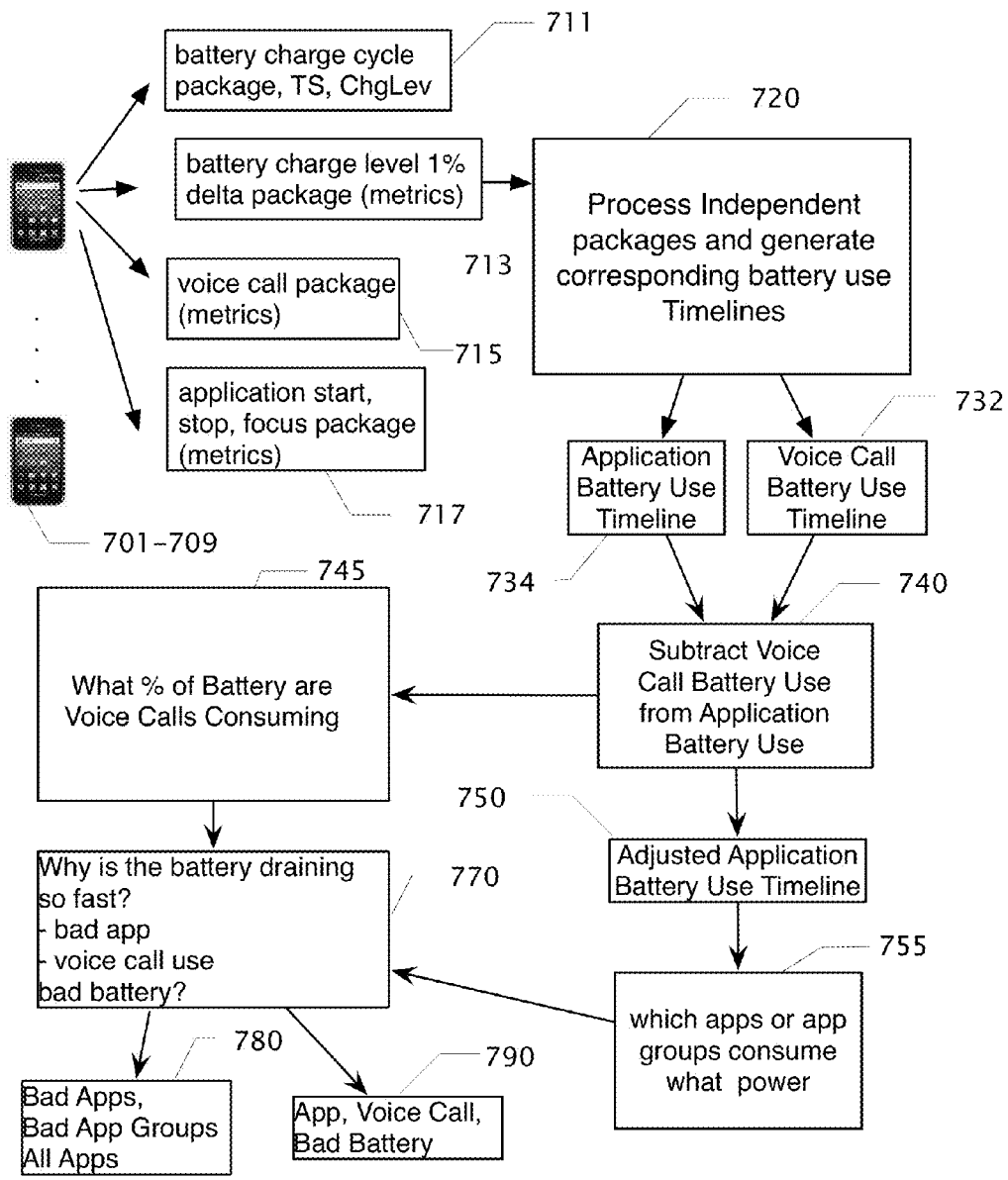
FIG. 7 is an illustration of Applicant's system from the location of data capture and transmittal through the method steps to obtain a beneficial transformation of the data packages.

Now, referring to FIG. 7. In an embodiment we focus on one mobile device (mobile) 701 collecting information. In an other embodiment a plurality of mobile devices 701-709 collects such information about the applications, battery, voice calls, and other activities. The mobile collects information, via an Agent, and a Profile, disparate packages of metrics corresponding to each voice call 715, battery capacity charge cycle 711 and 713 discharge events (e.g. every 1% change), and application start/stop/focus 717 events. It would be convenient for the mobile to directly provide the battery use for each distinct activity. In some cases it is possible for the mobile to directly collect and provide information corresponding to the percentage battery use of each application, such as the case described in FIGS. 4, 5, 6.

In other cases, as depicted in 717 information about application start, stop, focus events is collected, such as the case described in FIGS. 1, 2, 3.

All of the independent packages are processed 720 and used to generate a voice call battery use timeline 732 and Application battery use timeline 734. The method combines these two sources of information 740. In an embodiment, the method comprises subtracting 740 voice call battery use from total battery use to estimate adjusted application battery use 750. In the case when it is possible to collect from the mobile the specific application battery use, such as in FIGS. 4, 5, 6 then subtracting of the Application Battery Use Timeline from the Application Battery Use timeline is not necessary. In an embodiment, a computation determines what percentage of battery use is consumed by voice calls 745. Then the method may determine groups of applications or in some cases individual applications which consume substantial amounts of battery 755. Furthermore, it may be beneficial to subtract from the Application Battery Use Timeline battery use from processes that are independent of application battery use. In the case when the mobile does not directly provide the application battery use, then other impacts to battery use are intermingled with the application battery use timeline. In this case, such as when correcting the Application Battery Use Timeline with the Voice Call Battery Use Timeline then other timelines such as for Radio operations which search, connect, and maintain connection between calls may be corrections, that is can be subtracted from timelines like application use. Other types of packages are possible, for example, "searching" in order to quantify the battery use due to cell searching. Finally a subjective judgmental evaluation of good, bad, and evil 770 may distinguish what consumers may perceive to be groups of Applications or individual Applications which are undesirable 780 or which are substantially out of conventional usages 790.

One aspect of the invention is an analysis server comprising non-transitory storage for metric packages and a processor configured to transform metric packages into a timeline of battery discharge and application activity, the metric packages received from at least one mobile wireless device.

An other aspect of the invention is a system which has at least one wireless device communicatively coupled over a radio channel to an analysis server, the server configured to receive packages, transform the data within the packages into a battery timeline and identify the applications or components which consume the greatest quantity of charge or discharge at the highest rate.

An other aspect of the invention is a computer-implemented method of operating a wireless device communicatively coupled to an analysis server via a hybrid network including a radio channel and a packet switched wide area network, the method has among other conventional steps: recording and transmitting battery charge and discharge packages of metrics, receiving and transforming battery charge and discharge packages of metrics into a sequence of charge sources and drains, and determining the most significant consumers in charge space.

An other aspect of the invention is a method for collecting packages of charge related metrics at the wireless device, recording and transmitting a metrics package for each battery charge cycle; recording and transmitting a radio transmission/reception package for interaction on the baseband channel; recording and transmitting battery discharge milestone packages; recording and transmitting application activity/quiescence packages; and recording and transmitting content transfer and consumption activity packages.

An other aspect of the invention is a method for collecting and transforming packages of charge related metrics at the analysis server: receiving a metrics package for each battery charge cycle; receiving a metrics package for each radio channel activity; receiving a plurality of battery discharge milestone packages; receiving a metrics package for application activity/quiescence; receiving a metrics package for content transfer and consumption; and generating a battery discharge event sequence and drain schedule.

By the above, the invention provides the answer to the question which applications or components are responsible for draining the battery so fast or in other words, those that are responsible for inordinate battery drain, by transforming disparately collected information streams for the device into an application battery timeline, and by enabling algorithms for identifying applications/components which inordinately drain the battery.

The invention is distinguished by its method to create a timeline i.e. receiving a stream of charge cycle events, receiving a stream of application in/out focus events, while there are remaining charge cycle events in the charge cycle event stream, selecting next charge cycle event and adding to a timeline, when the next event is a charge cycle event, repeating selection step above, else, selecting next application in/out focus event, and application id, append charge level of closest discharge event after charge cycle, the discharge event timestamp and add to the timeline, similarly add next event into the timeline until there are no more events in either stream. In an embodiment, the invention further subtracts the battery use due to voice call functionality and other wireless function battery use from specific battery use timelines.

Another aspect of the invention is analyzing provided packages by receiving a discharge event stream, receiving a charge cycle event stream, receiving an application relative battery drain sample stream, while there are events remaining in any event stream; determining if the next event is a discharge or a charge cycle event, when the next event is a charge cycle event, adding it to the timeline, when the next event is a discharge event, querying the App-Battery App Metrics and adding it to the timeline, with the timestamp of the discharge event and with battery level from the discharge stream.

The invention is distinguished from conventional methods by firstly quantifying consumption of battery charge by mobile wireless phone functionality, wherein phone functionality comprises at least one of searching and voice calling, and secondly, subtracting voice calling consumption out of the total battery use to determine the use of the battery by applications.

The method is distinguished from conventional methods at each mobile device by capturing information in at least one of the following formats: sampling application activity each time an application comes into focus and recording a timestamp and the background or out of focus applications, sampling application activity each time an application turns on or turns off and recording a timestamp and the background or out of focus applications, sampling application activity on any change of application focus, sampling percentage of battery use by each application or component at period timesteps, sampling percentage of battery use by each application or component at quantity of battery discharge, recording and transmitting metrics of voice call start time, stop time, and transmitter power use, recording timestamp each quantity of battery discharge, recording start and end of battery charge cycle, timestamp and corresponding charge level, and uploading disparate packages to the network for magical processing where a miracle occurs.

CONCLUSION

The present patent application discloses a novel method to transform disparately collected device activity information comprising: identifying bad applications, identifying wireless phone activities, identifying conditions that result in inordinately high battery use, identifying battery use trends that are expected for the usage pattern, and aggregating single device trends across devices, and identifying aggregate device battery use trends and bad applications.

In other words, the process beneficially transforms data packages recorded at mobile devices by quantifying the wireless device activities and conditions that result in battery use; identifying applications that consume an inordinate amount of battery use as compared to the usage pattern; identifying inordinate high battery use relative to usage pattern; quantifying wireless phone functions and conditions that result in battery use and high battery drain; generating a global battery use store from which global battery use trends are identified and used at the device level to improve identification of bad app devices.

The beneficial effect of the invention claimed below is determining total battery drain demands and use, providing a total battery use profile by applications and phone functions, determining if there is a hardware problem, determining if there is an application which inordinately drains battery, determining if there is high voice call use, determining if there is poor coverage by measuring transmitter power during voice calls.

In summary the invention determines why a battery is draining so fast e.g.: if a battery is defective by not fully charging; if there is an other hardware problem; if there is a bad charger; if there is bad coverage; and determining if there is a bad application.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims. The method is easily distinguished from conventional methods by transforming the collected data into samples of discharge events at uniform delta charge rather than uniform delta time where delta refers to incremental change of charge in the battery or incremental units of time.

I claim:

1. A method for determining battery use by one or more applications operating on a mobile device, the method comprising:
    receiving packages from a mobile device at an analysis server, wherein:
        a first package included in the packages includes focus transition events that identify which of the one or more applications is in focus, which of the one or more applications are out of focus, and a timestamp for each of the transition events;
        a second package included in the packages includes charge cycle events that each include a start time stamp and an associated battery level and a stop timestamp and an associated battery level; and
        a third package included in the packages includes discharge events, wherein each discharge event includes a timestamp that is associated with an increment of discharge from the battery;
    associating, by the analysis server, the focus transition events, the charge cycle events and the discharge events based on the timestamps; and
    determining, by the analysis server, how each of the one or more applications contribute to the battery consumption in the mobile device based on the associations between the focus transition events, the charge cycle events, and the discharge events.

2. The method of claim 1, further comprising:
    generating a focus transition event by:
        sampling application activity each time an application turns on or turns off to identify the application in focus and the applications out of focus; and
        recording a timestamp, wherein the timestamp is associated the out of focus applications and the application in focus for the specific focus transition event.

3. The method of claim 1, wherein associating the focus transition events, the charge cycle events and the discharge events further includes generating a timeline that correlates the transition events with the discharge events such that battery consumption of each of the one or more applications can be determined.

4. The method of claim 3, further comprising determining a percentage battery use for each of the one or more applications using the timeline and associations between the focus transition events and the discharge events.

5. The method of claim 1 further comprising:
receiving metrics related to voice calls, the metrics including call start times, call stop times, and transmitter power use from the mobile device.

6. The method of claim 1, further comprising discarding events in the packages occurring when the mobile device is charging, wherein events occurring while the mobile device is charging are identified from the charge cycle events.

7. The method of claim 1, further comprising receiving the packages from multiple mobile devices.

8. The method of claim 7, further comprising determining battery consumption of the one or more applications across the multiple mobile devices.

9. The method of claim 1, further comprising estimating a battery level associated with a focus transition event using a closest discharge event based on the timestamp of the focus transition event and timestamps of the discharge events.

10. The method of claim 1, wherein the discharge events occur after a unit level of discharge has occurred.

11. The method of claim 1, further comprising identifying which of the one or more applications inordinately drain the battery.

12. The method of claim 1, further comprising:
generating a timeline for the events included in the packages;
selecting a next event and when the next event is a charge cycle event, adding the charge cycle event to the timeline;
selecting a next focus transition event and an application identifier and adding the next focus transition event to the timeline;
appending a charge level of a closest discharge event after a charge cycle to the focus transition event added to the timeline;
appending the timestamp of the discharge event;
adding the discharge event to the timeline;
adding a next event into the timeline until there are no more events in the packages;
determining a total application battery use timeline;
determining a voice call battery use timeline; and
subtracting voice call battery use from total battery use.

13. The method of claim 1, further comprising identifying aggregate device battery use trends and applications that use the battery by:
determining a total battery drain demands and use;
providing a total battery use profile by the one or more applications and phone functions;
determining if there is a hardware problem in the mobile device;
determining if at least one of the one or more applications inordinately drains the battery;
determining if there is high voice call use; and
determining if there is poor coverage by measuring transmitter power during voice calls; and
determining which application groups consume greatest power of the battery.

14. A method for determining battery use by applications operating on a device, the method comprising:
receiving device operation streams from at least one mobile device operating in a network, wherein the device operation streams include events and wherein each event is associated with a timestamp, wherein the events include focus transition events and discharge events;
adding the focus transition events to a battery use timeline, wherein each focus transition event identifies which of one or more applications operating on the at least one mobile device is in focus and which of the one or more applications are out of focus;
adding the discharge events to the battery use timeline, wherein each discharge event includes a timestamp that is associated with an increment of discharge from the battery;
after all events are added to the timeline, determining a battery use for each of the applications operating on the device based at least on the associations between the focus transition events and the battery discharge amounts determined from discharge events included in the events.

15. The method of claim 14, further comprising determining battery use by each of the applications based on the timeline.

16. The method of claim 15, further comprising determining a portion of the battery discharge amount for the application in focus and the applications out of focus at each of event, wherein events associated with device charging are not considered.

17. The method of claim 16, further comprising subtracting battery use associated with voice calls from the battery discharge amount.

* * * * *